US012658510B2

(12) United States Patent
Ma et al.

(10) Patent No.: US 12,658,510 B2
(45) Date of Patent: Jun. 16, 2026

(54) HOUSING STRUCTURE AND METHOD OF MANUFACTURING THE SAME, AND ELECTRONIC DEVICE HAVING THE SAME

(71) Applicants:FUYU PRECISION COMPONENT(KUNSHAN)CO., LTD., Suzhou (CN); Foxconn Technology Co., Ltd., New Taipei (TW)

(72) Inventors: Hung-Chun Ma, New Taipei (TW); Fuh-Feng Tang, New Taipei (TW); Ching-Sheng Sun, New Taipei (TW); Hai-Peng Yan, Shenzhen (CN)

(73) Assignees: FUYU PRECISION COMPONENT(KUNSHAN)CO., LTD., Suzhou (CN); Foxconn Technology Co., Ltd., New Taipei (TW)

( * ) Notice: Subject to any disclaimer, the term of this patent is extended or adjusted under 35 U.S.C. 154(b) by 631 days.

(21) Appl. No.: 18/119,613

(22) Filed: Mar. 9, 2023

(65) Prior Publication Data

US 2023/0352776 A1      Nov. 2, 2023

(30) Foreign Application Priority Data

Apr. 29, 2022    (CN) .......................... 202210475650.6

(51) Int. Cl.
| | |
|---|---|
| *H01M 50/122* | (2021.01) |
| *C08K 3/40* | (2006.01) |
| *C08K 7/14* | (2006.01) |
| *C08L 67/03* | (2006.01) |
| *C09J 11/06* | (2006.01) |
| *C09J 133/08* | (2006.01) |
| *C09J 183/04* | (2006.01) |
| *H01M 50/14* | (2021.01) |

(52) U.S. Cl.
CPC ............. *H01M 50/122* (2021.01); *C08K 3/40* (2013.01); *C08K 7/14* (2013.01); *C08L 67/03* (2013.01); *C09J 11/06* (2013.01); *C09J 133/08* (2013.01); *C09J 183/04* (2013.01); *H01M 50/14* (2021.01)

(58) Field of Classification Search
None
See application file for complete search history.

(56) References Cited

FOREIGN PATENT DOCUMENTS

| | | | |
|---|---|---|---|
| CN | 104470297 | * | 3/2015 |
| CN | 104470297 | A | 3/2015 |

(Continued)

*Primary Examiner* — Yan Lan
(74) *Attorney, Agent, or Firm* — ScienBiziP, P.C.

(57) ABSTRACT

A housing structure includes a substrate, a first adhesive layer, and a silica gel layer. The substrate includes a first portion, and the first portion includes polybutylene terephthalate and glass fibers, the glass fibers and the polybutylene terephthalate are in a ratio between 40% and 50% by weight. The first adhesive layer is formed on the first portion. The first adhesive layer includes polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight. The silica gel layer is formed on the first adhesive layer, and the first adhesive layer bonds the silica gel layer to the first portion.

14 Claims, 4 Drawing Sheets

(56)     References Cited

FOREIGN PATENT DOCUMENTS

| CN | 105522683 | * | 4/2016 |
|---|---|---|---|
| CN | 105522683 A | | 4/2016 |
| JP | H11-042674 A | | 2/1999 |
| JP | H1142674 | * | 2/1999 |

* cited by examiner

100

50

60

60

<u>1</u>

HOUSING STRUCTURE AND METHOD OF MANUFACTURING THE SAME, AND ELECTRONIC DEVICE HAVING THE SAME

FIELD

The subject matter herein generally relates to electronic devices, and more particularly, to a housing structure, a method of manufacturing the housing structure, and an electronic device having the housing structure.

BACKGROUND

Bottom housings of electronic devices may be made of a metal material. Antennas for signal transmission are disposed on the bottom housing, and the metal material may cause interference to the antenna. Specifically, when the bottom housing is entirely made of the metal material, the performance of signal transmission is affected. Therefore, insulating material such as silica gel may be added to the bottom housing.

During manufacturing, a metal substrate is first bonded to the silica gel by an adhesive layer to obtain a multilayered structure, and the multilayered structure is then placed into a machine for hot-pressing and vulcanization molding. However, the temperature of hot-pressing is above 100 degrees Celsius. Since metal and silica gel have different surface properties, the adhesive layer that have large adhesion to metal may has low adhesion to silica gel, resulting in poor strength of the bottom housing.

Therefore, there is a room for improvement in the art.

BRIEF DESCRIPTION OF THE DRAWINGS

Implementations of the present technology will now be described, by way of embodiment, with reference to the attached figures.

DETAILED DESCRIPTION

Figure 1:
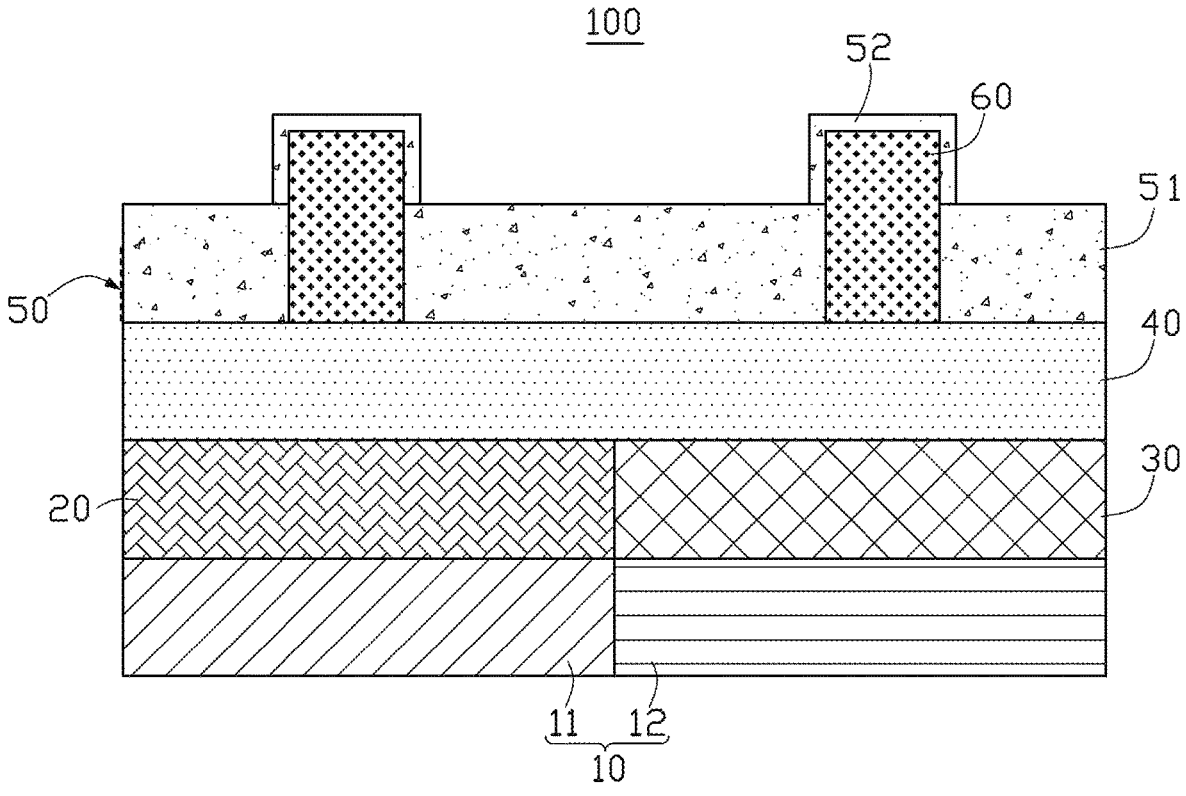
FIG. 1 is a cross-sectional view of a housing structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, a housing structure 100 is provided according to an embodiment of the present disclosure. The housing structure 100 includes a substrate 10, a first adhesive layer 20, and a second adhesive layer 30. The substrate 10 includes a first portion 11 and a second portion 12. The first portion 11 and a second portion 12 may be on a same plane. The first adhesive layer 20 is formed on the first portion 11. The second adhesive layer 30 is formed on the second portion 12.

The housing structure 100 further includes a silica gel layer 40 formed on the first adhesive layer 20 and the second adhesive layer 30. Each of the first adhesive layer 20 and the second adhesive layer 30 is sandwiched between the silica gel layer 40 and the substrate 10. The first adhesive layer 20 bonds the silica gel layer 40 to the first portion 11. The second adhesive layer 30 bonds the silica gel layer 40 to the second portion 12.

The first portion 11 includes glass fibers and polybutylene terephthalate (PBT). The glass fibers and the polybutylene terephthalate are in a ratio between 40% and 50% by weight. The first adhesive layer 20 includes polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight.

The silica gel layer 40 can be formed by a vulcanization process. During the vulcanization process, the first adhesive layer 20 reacts with each of the first portion 11 and the silica gel layer 40 by chemical bonding, thereby strengthening a bonding strength of the first portion 11 and the silica gel layer 40.

The second portion 12 includes a metal alloy. In at least one embodiment, the metal alloy includes at least one of magnesium alloy and aluminum alloy. For example, the magnesium alloy includes magnesium alloy AZ91D, and the aluminum alloy includes aluminum alloy 5052. The second adhesive layer 30 includes a silane coupling agent in a range of 12% to 30% by weight, ethanol in a range of 26% to 38% by weight, isopropanol in a range of 4% to 11% by weight, and petroleum ether in a range of 18% to 22% by weight.

In at least one embodiment, a thickness of the silica gel layer 40 is in a range of 0.3 mm to 2 mm. In at least one embodiment, the thickness of the silica gel layer 40 is in a range of 0.3 mm to 0.5 mm.

Figure 2:
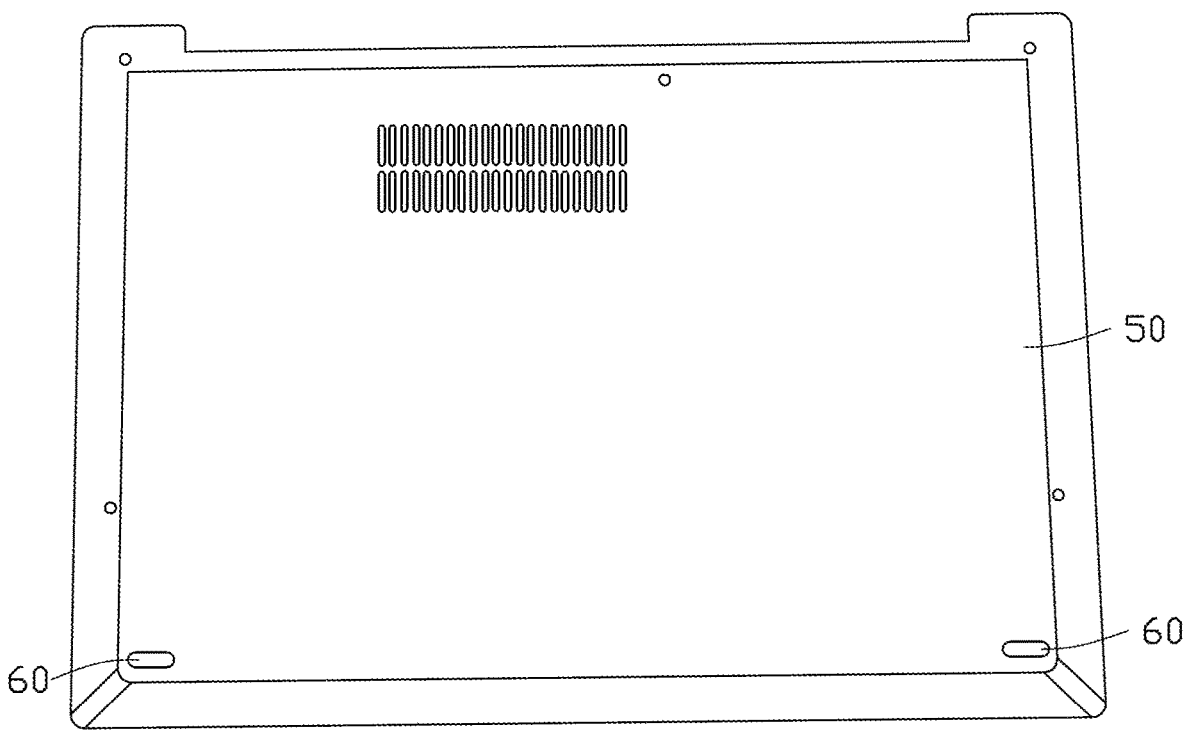
FIG. 2 is a vertical view of the housing structure of FIG. 1.

In at least one embodiment, referring to FIG. 2, the housing structure 100 further includes at least two pads 60. The pads 60 are disposed in the silica gel layer 40 and partially protrudes from the silica gel layer 40. By embedding the pads 60 in the silica gel layer 40, the pads 60 are prevented from being separated from the silica gel layer 40.

In at least one embodiment, referring to FIG. 1, the housing structure 100 further includes a protective layer 50 formed on the silica gel layer 40. The protective layer 50 may be an anti-fingerprint layer, an anti-oxidation layer, or an anti-corrosion layer. In at least one embodiment, the protective layer 50 includes a third portion 51 formed on the silica gel layer 40 and a fourth portion 52 formed on the third portion 51. The pads 60 may further protrude from the third portion 51, and the fourth portion 52 covers the pads 60 that protrude from the third portion 51.

Example 1

The first portion 11 includes glass fibers and polybutylene terephthalate (PBT). The glass fibers and the polybutylene terephthalate are in a ratio of 45% by weight. The first adhesive layer 20 includes polysiloxane of 3.5% by weight, acrylic resin of 4% by weight, isopropanol of 25% by weight, cyclohexane of 25% by weight, and toluene of 25% by weight.

The second portion 12 includes magnesium alloy AZ91D or aluminum alloy 5052. The second adhesive layer 30 includes a silane coupling agent of 16% by weight, ethanol of 27% by weight, isopropanol of 7.5% by weight, and petroleum ether of 20% by weight.

Comparative Example 1

Different from Example 1, the first portion 11 includes glass fibers and polyphenylene sulfide. The glass fibers and the polyphenylene sulfide are in a ratio of 45% by weight.

Comparative Example 2

Different from Example 1, the first adhesive layer 20 includes a silane coupling agent of 16% by weight, ethanol of 32% by weight, isopropanol of 7.5% by weight, and petroleum thereof 20% by weight.

The products obtained by Example 1 and Comparative Examples 1-2 are tested by a cross-cut test according to test standard of ASTM D3359. Results show that each adhesive layer does not separate from the substrate 10 and the silica gel layer 40. However, in Comparative Example 1, the first adhesive layer 20 separates from the first portion 11, which indicates that the first adhesive layer 20 in the present disclosure has poor adhesion with polyphenylene sulfide. Thus, it is better for the first portion 11 to select polybutylene terephthalate as the insulating material. In Comparative Example 2, the adhesive layer also separates from the first portion 11, which indicates that the components of the second adhesive layer 30 are not be used to bond the first portion 11 and the silica gel layer 40.

Therefore, the first adhesive layer 20 in the present disclosure has good adhesion with the first portion 11 including polybutylene terephthalate and glass fibers. Since the substrate 10 has different materials, the present disclosure uses different adhesive layers to bond such different materials to the silica gel layer.

Figure 3:
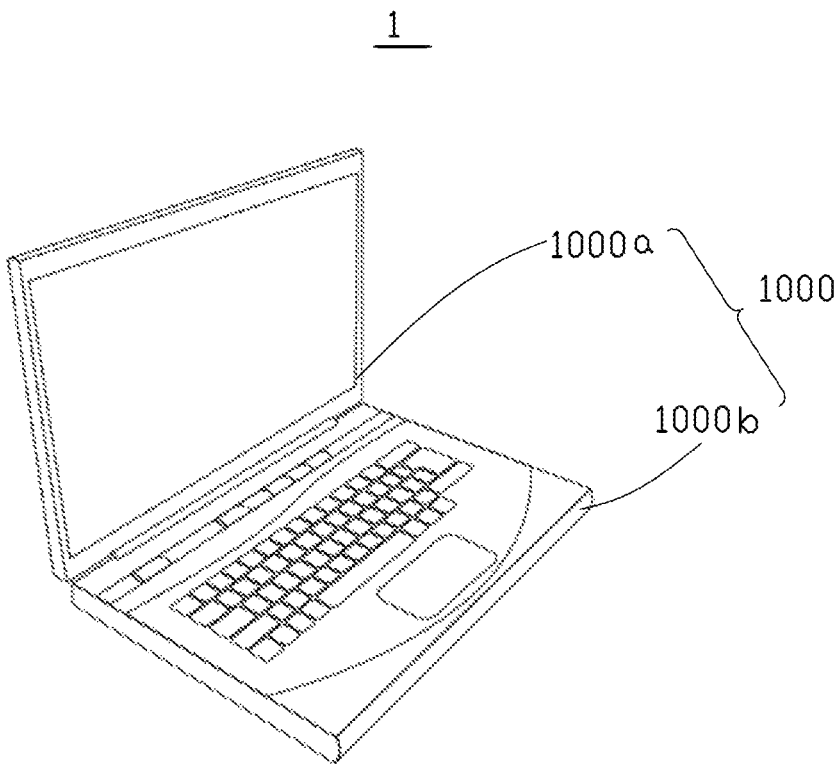
FIG. 3 is a diagrammatic view of an electronic device according to an embodiment of the present disclosure.

Referring to FIG. 3, an electronic device 1 is further provided according to an embodiment of the present disclosure. The electronic device 1 includes a housing assembly 1000. The housing assembly 1000 includes a first housing 1000a and a second housing 1000b. The first housing 1000a and the second housing 1000b cooperatively form a receiving space for receiving electronic components of the electronic device 1. The second housing 1000b may include the housing structure 100 in the above embodiment.

Figure 4:
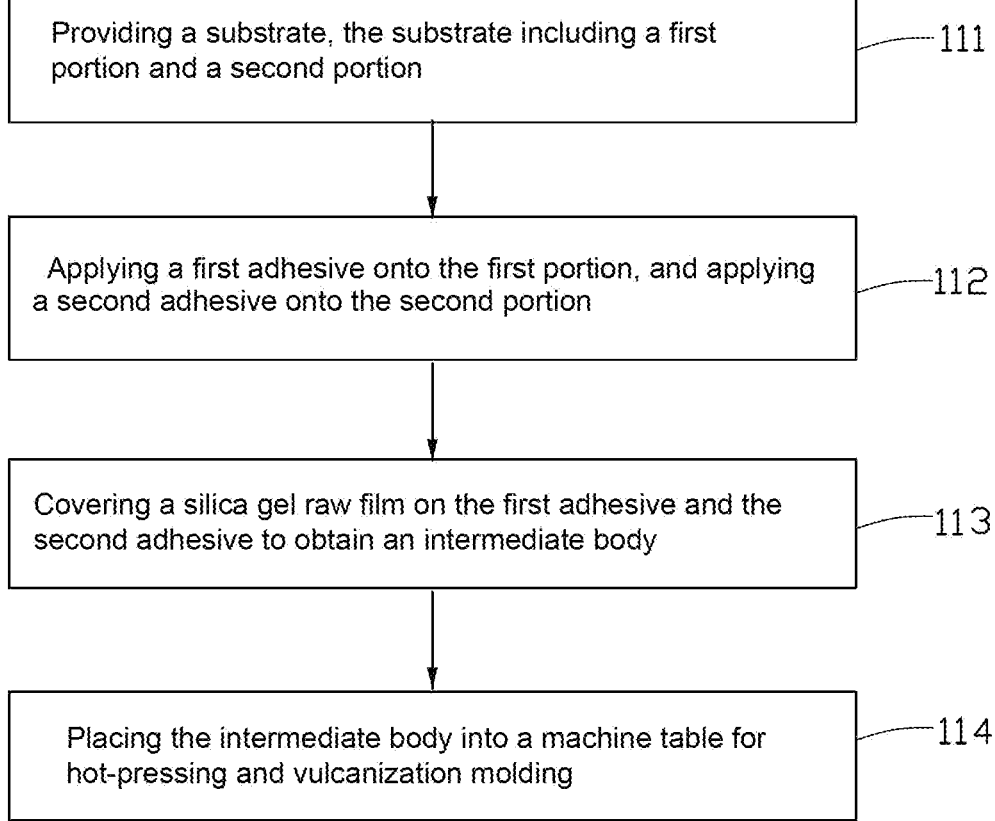
FIG. 4 is a flowchart of a method of manufacturing a housing structure according to an embodiment of the present disclosure.

Referring to FIG. 4, a method of preparing the housing structure 100 is provided by way of example, as there are a variety of ways to carry out the method. Each block shown in the figure represents one or more processes, methods, or subroutines, carried out in the example method. Furthermore, the illustrated order of blocks is illustrative only and the order of the blocks can change. Additional blocks can be added, or fewer blocks may be utilized, or the order of the blocks may be changed, without departing from this disclosure. The method can begin at block 11.

In block 111, the substrate 10 is provided. The substrate 10 includes a first portion 11 and a second portion 12. The first portion 11 and a second portion 12 may be on a same plane. The first portion 11 includes glass fibers and polybutylene terephthalate (PBT). The glass fibers and the polybutylene terephthalate are in a ratio between 40% and 50% by weight. The second portion 12 includes a metal alloy.

In block 112, a first adhesive is applied onto the first portion 11, and a second adhesive is applied onto the second portion 12. The first adhesive includes polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight. The second adhesive includes a silane coupling agent in a range of 12% to 30% by weight, ethanol in a range of 26% to 38% by weight, isopropanol in a range of 4% to 11% by weight, and petroleum ether in a range of 18% to 22% by weight.

In block 113, a silica gel raw film covers on the first adhesive and the second adhesive to obtain an intermediate body.

In block 114, the intermediate body is placed into a machine table for hot-pressing and vulcanization molding, thereby obtaining the housing structure 100.

In at least one embodiment, the hot-pressing and vulcanization molding is performed under a pressure of 160 kg/cm$^2$, a temperature of 160 degrees Celsius to 165 degrees Celsius, for a duration of 1 minute to 5 minutes. Under the above condition, the first portion 11 that made of insulating layer may not be deformed during the molding, and the silica gel raw film can be fully cured after a short duration. Moreover, swelling of the adhesive layer is prevented after curing, thus the surface smoothness of the product and the bonding strength of the substrate 10 and the silica gel layer 40 are not affected.

Different temperatures and durations may have different effects. For example, when the temperature is 150 degrees Celsius and the duration is 20 minutes, the silica gel raw film is not completely vulcanized, the surface of the whole housing structure is not completely dried and slightly bulged through visual observation. When the temperature is 160 degrees Celsius and the duration is 15 minutes, the silica gel raw film is completely vulcanized, but tiny bulges are produced on the surface of the first portion 11, and no bulges are observed on the surface of the second portion 12. When the temperature is 160 degrees Celsius to 165 degrees Celsius and the duration is less than or equal to 5 minutes, the silica gel raw film is completely vulcanized, and the surface of the whole housing structure does not produce visible bulges, meeting the requirements of surface flatness. When the curing temperature is 170 degrees Celsius and the duration is 12 minutes, the surface of the first portion 11 produces bulges, no bulges are observed on the surface of the second portion 12, and the silica gel raw film is completely vulcanized. When the temperature is 180 degrees Celsius and the duration is 3 minutes, the surface of the first portion 11 produces large bulges, and no bulges are observed on the surface of the second portion 12. Therefore, the temperature and the duration affect the curing result of the silica gel raw film, and also decides whether the first portion 11 produces bulges, thus affecting the bonding strength of the first portion 11 and the silica gel layer 40.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A housing structure comprising:
a substrate comprising a first portion, wherein the first portion comprises polybutylene terephthalate and glass fibers, the glass fibers and the polybutylene terephthalate are in a ratio between 40% and 50% by weight;
a first adhesive layer formed on the first portion, wherein the first adhesive layer comprises polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight;
a silica gel layer formed on the first adhesive layer, the first adhesive layer bonding the silica gel layer to the first portion.

2. The housing structure according to claim 1, wherein the substrate further comprises a second portion and a second adhesive layer formed on the second portion, the second portion comprises a metal alloy, the second adhesive layer comprises a silane coupling agent in a range of 12% to 30% by weight, ethanol in a range of 26% to 38% by weight, isopropanol in a range of 4% to 11% by weight, and petroleum ether in a range of 18% to 22% by weight, the silica gel layer is further formed on the second adhesive layer, and the second adhesive layer bonds the silica gel layer to the second portion.

3. The housing structure according to claim 2, wherein the metal alloy comprises at least one of magnesium alloy and aluminum alloy.

4. The housing structure according to claim 2, further comprising at least two pads, wherein the at least two pads are disposed in the silica gel layer, and each of the at least two pads partially protrudes from the silica gel layer.

5. The housing structure according to claim 2, further comprising a protective layer formed on the silica gel layer.

6. An electronic device comprising:
a housing assembly comprising a first housing and a second housing, wherein the first housing and the second housing cooperatively form a receiving space, the second housing comprising:
a substrate comprising a first portion, wherein the first portion comprises polybutylene terephthalate and glass fibers, the glass fibers and the polybutylene terephthalate are in a ratio between 40% and 50% by weight;
a first adhesive layer formed on the first portion, wherein the first adhesive layer comprises polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight;
a silica gel layer formed on the first adhesive layer, the first adhesive layer bonding the silica gel layer to the first portion.

7. The electronic device according to claim 6, wherein the substrate further comprises a second portion and a second adhesive layer formed on the second portion, the second portion comprises a metal alloy, the second adhesive layer comprises a silane coupling agent in a range of 12% to 30% by weight, ethanol in a range of 26% to 38% by weight, isopropanol in a range of 4% to 11% by weight, and petroleum ether in a range of 18% to 22% by weight, the silica gel layer is further formed on the second adhesive layer, and the second adhesive layer bonds the silica gel layer to the second portion.

8. The electronic device according to claim 7, wherein the metal alloy comprises at least one of magnesium alloy and aluminum alloy.

9. The electronic device according to claim 7, wherein the second housing further comprises at least two pads, the at least two pads are disposed in the silica gel layer, and each of the at least two pads partially protrudes from the silica gel layer.

10. The electronic device according to claim 7, wherein the second housing further comprises a protective layer formed on the silica gel layer.

11. A method of manufacturing a housing structure, comprising:
providing a substrate, wherein the substrate comprises a first portion, wherein the first portion comprises polybutylene terephthalate and glass fibers, the glass fibers and the polybutylene terephthalate are in a ratio between 40% and 50% by weight;
applying a first adhesive on the first portion, wherein the first adhesive comprises polysiloxane in a range of 2% to 5% by weight, acrylic resin in a range of 3% to 5% by weight, isopropanol in a range of 20% to 30% by weight, cyclohexane in a range of 20% to 30% by weight, and toluene in a range of 20% to 30% by weight;
covering a silica gel raw film on the first adhesive to obtain an intermediate body;
placing the intermediate body into a machine for hot-pressing and vulcanization molding.

12. The method according to claim 11, wherein the substrate further comprises a second portion, the second portion comprises a metal alloy, the method further comprises:
applying a second adhesive on the second portion, wherein the second adhesive comprises a silane coupling agent in a range of 12% to 30% by weight, ethanol in a range of 26% to 38% by weight, isopropanol in a range of 4% to 11% by weight, and petroleum ether in a range of 18% to 22% by weight, the silica gel raw film is further formed on the second adhesive to obtain the intermediate body.

13. The method according to claim 11, wherein the hot-pressing and vulcanization molding is performed under a temperature of 160 degrees Celsius to 165 degrees Celsius, for a duration of 1 minute to 5 minutes.

14. The method according to claim 11, wherein the metal alloy comprises at least one of magnesium alloy and aluminum alloy.

* * * * *